United States Patent [19]
Svendsen

[11] 3,942,933
[45] Mar. 9, 1976

[54] APPARATUS FOR MANUFACTURING HOLLOW ARTICLES, SUCH AS BOWLS, TRAYS, CUPS AND SIMILAR ARTICLES

[75] Inventor: Johan per Greijner Svendsen, Kristiansand S, Norway

[73] Assignee: Dyno Industrier A/S, Oslo, Norway

[22] Filed: June 4, 1974

[21] Appl. No.: 476,321

[52] U.S. Cl. ...... 425/324 R; 425/324 B; 425/326 B; 425/326 R; 425/388; 425/405 R; 425/397
[51] Int. Cl.² ......................................... B29C 24/00
[58] Field of Search ........ 425/324, 394, 451.9, 412, 425/398, 397, 324 B, 387 B, 388, 405, 326, 326 B

[56] References Cited
UNITED STATES PATENTS

| | | | |
|---|---|---|---|
| 2,962,758 | 12/1960 | Politis | 425/326 X |
| 3,105,270 | 10/1963 | Fibish | 425/422 |
| 3,166,790 | 1/1965 | Keyes | 425/388 X |
| 3,271,816 | 9/1966 | Schneider | 425/387 X |
| 3,359,600 | 12/1967 | O'Brien et al. | 425/157 |
| 3,518,334 | 6/1970 | Carrigan et al. | 425/397 X |
| 3,561,057 | 2/1971 | Butzko | 425/384 X |

*Primary Examiner*—Robert L. Spicer, Jr.
*Attorney, Agent, or Firm*—Browdy and Niemark

[57] ABSTRACT

Apparatus for so-called "in-line" production of hollow articles of thermoplastic material, by blowing or vacuum moulding a sheet strip produced continuously from an extruder and subsequent stamping of the separate articles. The mould tool consists of at least two mould half portions, which is moved along a rectilinear guide and substantially synchronously with the plastic strip. The guide for the mould tool and the direction of the sheet strip extend obliquely downwardly from the extruder nozzle, preferably at an angle to the horizontal plane of 30°–60°. In the zone of the guide path where the mould half portions open, stationary gripping fingers are arranged on both sides of the sheet strip. The fingers are adapted to engage the longitudinal edges of the sheet strip immediately prior to the mould half portions, being separated and to absorb the sheet strip while the mould tool returns for enclosure of a new portion of sheet strip.

3 Claims, 2 Drawing Figures

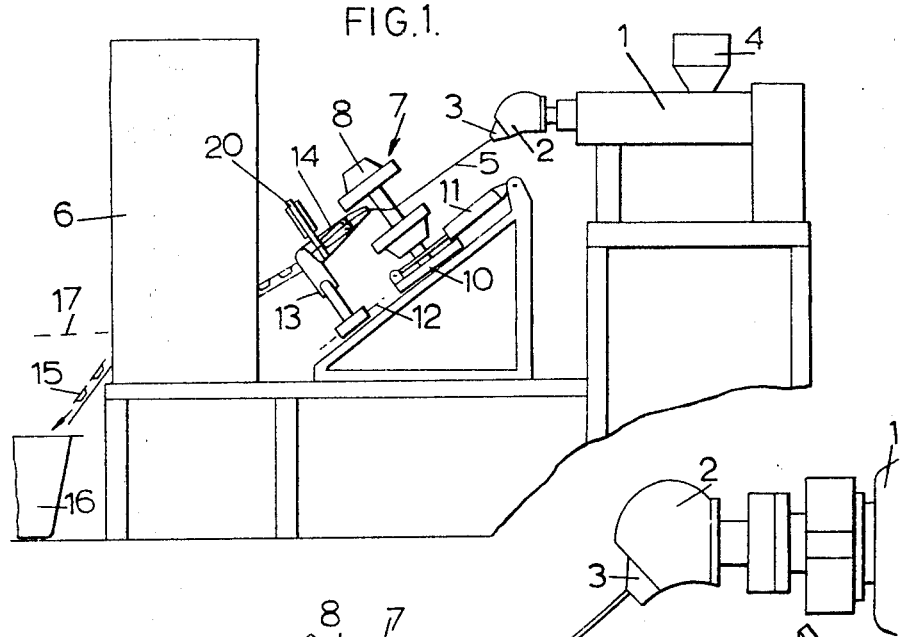
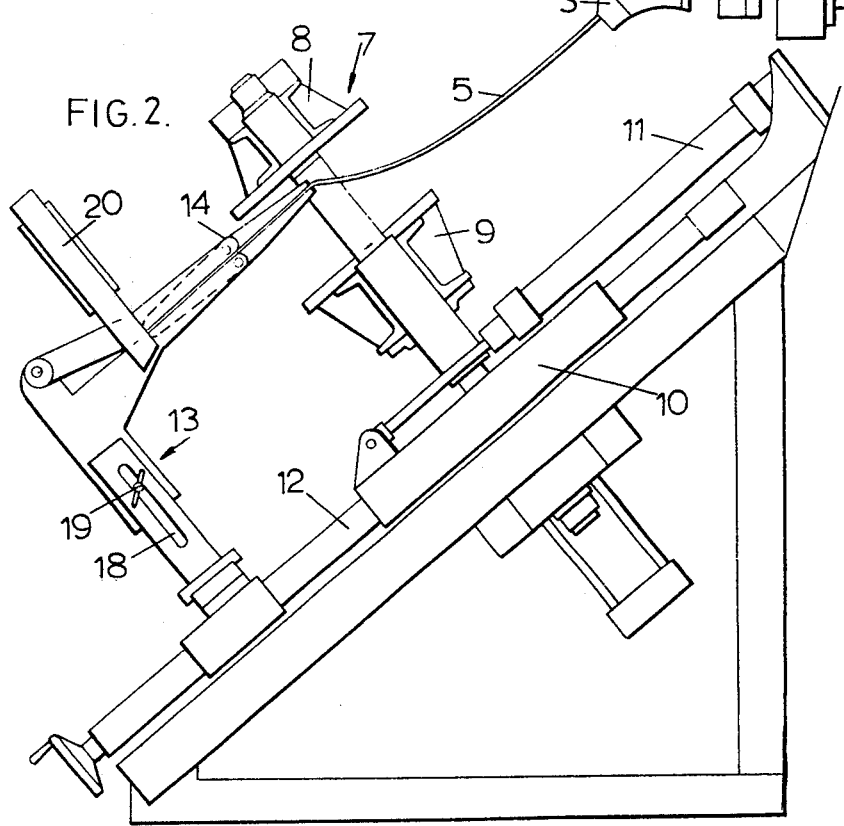

APPARATUS FOR MANUFACTURING HOLLOW ARTICLES, SUCH AS BOWLS, TRAYS, CUPS AND SIMILAR ARTICLES

The present invention relates to an apparatus for so-called in line production of hollow articles, such as bowls, trays, cups and similar articles of thermoplastic material, for example, polypropylene, polyethylene and the like, which are used substantially as disposable packaging, particularly in the foodstuff industry.

Articles of the above said type are generally moulded by means of a mould tool consisting of at least two half portions, possibly with a drawing piston, where the sheet, by means of heat, is made plastic and by a fluid pressure differential is either blown by means of compressed air or is drawn by means of a vacuum into the cavity in one of the mould half portions. Generally, a sheet strip is produced by means of a wide nozzle extruder, said strip being wound onto rollers and thereafter, in a separate machine, is formed to articles in the above described manner. This method requires transport from the extruder to the moulding machine and two separate machines require more space and manual operation than if it were possible to produce the articles in line, i.e. continuously after the extruder.

An apparatus is known which produces articles in line. This is a question of a typical mass-produced product where, at all times, the same moulds may be used. A plurality of mould half portions are arranged in two opposingly operated endless belts which travel at the same speed as the extruder and engage about the sheet strip or tube discharged from the extruder. Each mould half portion in one belt must be supplied with compressed air or vacuum during the moulding step if a sheet strip is used which is to be moulded to articles such as trays, cups, and the like. If a tube is used which is to be formed with ribs or the like, the compressed air may be supplied within the tube in that a trailing mandrel is arranged within the tube and compressed air introduced through the extruder nozzle. In both cases, but particularly in the first case, the necessary equipment is expensive and, as previously stated, can only be used in regard to typical mass production. As a rule, the amount of hollow articles produced for packaging is not such that it would be worth while to mould in line, in accordance with this method. The two-step process has therefore been used hitherto for this type of production.

The object of the present invention is to provide an apparatus for so-called in line production of hollow articles, such as bowls, trays, cups and the like of thermoplastic material, particularly for use as packaging, the said apparatus being inexpensive to produce, requires less space, eliminates previously necessary transport and requires less manual operation.

The most obvious procedure of a machine designer faced with the task of constructing an inexpensive apparatus capable of producing hollow articles of plastic in line after an extruder, would be to modify the moulding apparatus used when working from rollers. This is a stationary moulding tool consisting of two mould half portions which engage and form a sheet strip fed in stages from a roller and which, between the roller and the mould tool, is heated to plastic state. In order to utilize this mould tool in connection with a continuously fed sheet strip from a wide nozzle extruder, the mould tool must be arranged reciprocably along a preferably rectilinear path, such that the mould half portions engage about the plastic sheet strip adjacent the extruder nozzle, and travel along the path at approximately the same speed as the extruder discharge, open at the end of the path, when the articles are moulded and cooled, in order thereafter to return to the starting point. It proves that this method is not utilizable for all types of material if the extruder operates with horizontal direction of the sheet strip, which is natural. The sheet strip, after being pressed out of the extruder nozzle, would rapidly sink downwards to a curved path due to the force of gravity, particularly when materials of low melting strength are used, for example, polyethylene, polypropylene and the like. The collapsing tendency would be so great that the moulds must be moved away from one another sufficient to be clear of the downward curve. This causes a great distance of closure which would take a long time and the downward curve could cause fold formation. In line production of plastic articles is also known where a plastic sheet is extruded continuously downwardly in vertical direction. A reciprocating tool then moulds the articles from the thermoplastic, continuously produced sheet. It has proved in practice, however, that it is impossible with such a method of production to achieve an entirely uniform sheet, since serious problems of collapse arise in the vertically extruded sheet.

The above described problems are solved by means of the apparatus for so-called in line production of hollow articles, such as bowls, trays, cups and like articles of thermoplastic material when using blowing or vacuum moulding of a strip produced from an extruder and where, thereafter, the separate articles are locked, in the actual mould or in a secondary operation, and where the moulding tool, consisting of at least two mould half portions and possibly a drawing piston, during the moulding step, is moved along a preferably rectilinear guide path and substantially synchronously with the plastic strip, in order thereafter to open and return for enclosure about a new portion, the characterizing feature being that the guide for the mould tool, and the sheet direction of the sheet strip, extend obliquely downwardly from the extruder nozzle, preferably at an angle to the horizontal plane of 30°–60°, and that, at the zone of the guide path where the mould half portions open, stationary gripping fingers are arranged at both sides of the sheet strip, the said fingers being adapted to grip about the longitudinal edges of the sheet strip immediately before the mould half portions are separated and to maintain the sheet strip while the moulding tool returns.

By means of the apparatus, cups, bowls, trays and the like of very high quality may be produced, even from plastic material which is difficult to mould, such as polypropylene, polyethylene and the like. The apparatus is extremely simple and is inexpensive to produce, since it is only the moulding tool which move, viz. reciprocally on the oblique path, apart from the opening movement of the mould half portions. It has proved that even though the gripping fingers engaging at both sides of the sheet when the mould returns to the starting point are stationary, the collapse of the sheet strip is very limited by reason of the oblique direction of the extruder. The slight collapse is without practical significance, since it does not particularly affect the uniformity of the thickness of the sheet and allows also a relatively short path of movement for the mould half portion which is moved.

A further feature of the invention which allows the collapse of the sheet strip to be of minor significance during the moulding is that the extruding direction of the sheet strip is at a parallel spacing below a plane through the dividing line of the mould. The collapse then forms substantially at the end of the gripping fingers and the mould half portion may then operate with a relatively rectilinear sheet path during its return stroke.

When the mould half portions are enclosed about a new portion of the plastic sheet strip, the said strip has a tendency to form wrinkles at the side of the mould facing toward the extruder. The reason for this is that the sheet strip is not completely plane and tight, but has a slight collapse. In order to eliminate this, the gripping fingers are arranged such that when they engage the edge of the sheet they extend somewhat inwardly onto the non-moulded sheet strip between the moulding tool and the extruder nozzle and such that the fingers engage the edge of the sheet strip somewhat during division of the mould. The said spacings are adjustable in accordance with the different materials used. In this manner, a transverse stretching of the sheet strip is achieved in the zone directly to the rear of the moulding tool, in other words at the location where there would otherwise be a tendency to wrinkling.

A further feature of the invention is that the moulding tool is adapted to move somewhat more rapidly than the sheet production from the extruder, such that the sheet is stretched in longitudinal direction. The reason for this is that thermoplastic material, even in its plastic state, has some elasticity. This applies particularly to substances such as polypropylene, polyethylene and the like. This elasticity will cause a certain compaction of the sheet strip when the moulding tool returns to enclosure of a new area of the sheet strip. In this manner, it is possible to absorb some of the sheet strip produced while the stationary gripping fingers are engaged in the edge of the sheet strip and the mould tool returns to the starting point.

The invention is further explained in the following with reference to the drawing which in:

FIG. 1 illustrates in diagram an embodiment example of the apparatus according to the invention.

FIG. 2 shows details of the apparatus according to FIG. 1 in somewhat enlarged dimension and in more detail.

The main components of the apparatus comprise an extruder 1 with an extruder head 2 provided with a wide nozzle 3. The extruder has a hopper 4 for granulate or, when polyethylene, polypropylene and the like are concerned, can consist of material residue. The extruder 1 produces through a nozzle 3 a feed strip 5. Between the extruder 1 and a stamping apparatus 6, a mould tool 7 is arranged consisting of an upper half portion 8 and a lower half portion 9. The lower half portion 9 may be moved to and from engagement with the upper half portion 8. The moulding tool 7 is arranged on a slide 10, which by means of one or more power cylinders 11 can be moved reciprocally on an oblique guide 12. At the lower end of the guide 12, gripping fingers 14 are arranged on a frame 13, said gripping fingers being adapted to clamp onto the sheet strip 5. At the outlet of the stamping apparatus 6, the finished cups 15 fall into a box 16 and the stamped out sheet strip 17 can be cut up into smaller pieces and returned to the hopper 4.

The mould half portion 8 is, in manner known per se, supplied with compressed air for blow-moulding of the sheet 5 when the lower mould is brought into engagement with the upper mould. The upper mould portion 8 may also be provided with a drawing piston (known per se). The lower mould half portion is provided with one or more cavities for forming bowls, trays or cups. The guide 12 may, as illustrated in FIG. 2, consist of two steel rods (only one is shown). The frame 13 for the fingers 14 may be adjustable as to height by means of a slot 18 and nuts 19. The fingers 14 can be moved to and from by means of a cylinder 20, illustrated in diagram.

The apparatus operates in the following manner:

From the extruder nozzle 3 a plastic sheet strip 5 is produced continuously, said strip after discharge from the nozzle, being plastic. By means of the cylinder 11, the mould 7 with mould portions 8 and 9 spaced away from one another is brought into the zone immediately after the extruder nozzle. The lower mould half portion 9 is brought into engagement against the upper mould half portion 8. The sheet is then clamped between the mould half portions. At the same time as the sheet is gripped by the mould half portions, the piston 11 begins to guide the mould 7 downwardly along the path 12 at least the same speed as the sheet 5 is produced by the extruder. During this movement, the sheet is formed to articles in that air is blown into the mould half portions 8, said air pressing the sheet 5 into cavities in the lower mould 9. When the moulding is finished the sheet is cooled, the mould being water-cooled. When the mould 7, by means of the piston 11, is passed along the path 12 a distance such that the gripping fingers 14 with the upper ends thereof project somewhat above the mould 7, the movement of the mould stops and the gripping fingers 14 are brought together by means of the cylinder 20 and engage about the edge of the sheet 5 outside of and at the side of the mould. When the fingers 14 have gripped the sheet edge, the mould 7 is opened and rapidly returned to its starting point. This is the situation illustrated on the drawing. During return movement of the mould, which is very rapid, the extruder continues to discharge sheet, and since the fingers 14 are stationary and grip the sheet in this step of the production, a certain curve will necessarily be produced in the sheet 5. As will be clear from the drawing, however, the part located closest to the extruder is approximately rectilinear, since the curve is formed adjacent the end of the fingers 14. The reason for this is both the oblique direction of the sheet production and the parallel staggered plane of the fingers with respect to the extruder direction. The mould in open condition has then, during the return movement, an approximately straight sheet with which to operate.

When the fingers 14 open and the mould encloses the sheet for forming new articles, the articles moulded in a previous step are conveyed into the stamping apparatus 6.

I claim:

1. An in-line apparatus for the production of hollow articles, such as bowls, trays, cups and similar articles of thermoplastic material by fluid pressure differential molding a continuous sheet of the thermoplastic material comprising:

an extruder having an extruder nozzle for producing the continuous strip of thermoplastic material;
a mold tool including a top and bottom mold half portion;

piston means for opening and closing said mold tool;
a rectilinear guide upon which said mold tool is attached, said guide extending obliquely downward from below said extruder nozzle at an angle to the horizontal plane of between 30° and 60°;
reciprocating means connected to said mold tool for reciprocating said mold tool along said rectalinear guide;
gripping means attached to said rectilinear guide for engaging longitudinal edges of the thermoplastic material immediately prior to the opening of said mold tool and for holding the thermoplastic material while said mold tool returns for enclosure of a new portion of the thermoplastic material.

2. An apparatus according to claim 1 wherein the longitudinal axis of said extruder nozzle extends in a plane parallel to and below a plane through the center of the mold in a closed position.

3. An apparatus according to claim 1 further including a stamping means adjacent to the lower end of said guide for the stamping of the hollow articles.

* * * * *